United States Patent
Lohrbach

(10) Patent No.: US 6,259,672 B1
(45) Date of Patent: *Jul. 10, 2001

(54) METHOD AND APPARATUS FOR PROVIDING DELAYED COMMUNICATIONS WITHIN A COMMUNICATION SYSTEM

(75) Inventor: Jeffrey G. Lohrbach, Elgin, IL (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/976,664

(22) Filed: Nov. 24, 1997

(51) Int. Cl.[7] .............................. G06F 11/00; H04M 1/64
(52) U.S. Cl. ..................... 370/235; 370/468; 379/67.1; 379/68
(58) Field of Search ....................................... 370/350, 353, 370/354, 465, 466, 468, 401, 257, 269, 428, 238, 235; 379/68, 88.22, 67.1, 88.28, 88.26, 88.27, 211

(56) References Cited

U.S. PATENT DOCUMENTS

| 5,003,577 | * | 3/1991 | Ertz et al. | 379/89 |
|---|---|---|---|---|
| 5,193,110 | * | 3/1993 | Jones et al. | 379/93.14 |
| 5,434,856 | * | 7/1995 | Huang | 370/267 |
| 5,577,042 | * | 11/1996 | McGraw, Sr. et al. | 370/257 |
| 5,703,881 | * | 12/1997 | Kay et al. | 370/468 |
| 5,867,495 | * | 2/1999 | Elliott et al. | 370/352 |
| 6,034,946 | * | 3/2000 | Roginsky et al. | 370/351 |

* cited by examiner

Primary Examiner—Alpus H. Hsu
Assistant Examiner—Afsar M. Qureshi
(74) Attorney, Agent, or Firm—Steven R. Santema

(57) ABSTRACT

A method of providing delayed communications within a communication system begins with the steps of detecting (201) selection of simultaneous transmission of a message on at least one communication resource and recording (203) at least a part of the message, yielding a recorded message. When at least one of the at least one communication resource has a busied status, resulting (205) in at least one busied resource, and subsequently when at least one of the at least one busied resource becomes free, transmitting (2075) at least a part of the recorded message on the at least one of the at least one busied resource that became free. In addition, the method may further include the step of monitoring (2071) the at least one busied resource for a free status. The transmitting (2075) step may begin before the completion of the transmission on the first busied resource.

11 Claims, 3 Drawing Sheets

METHOD AND APPARATUS FOR PROVIDING DELAYED COMMUNICATIONS WITHIN A COMMUNICATION SYSTEM

FIELD OF THE INVENTION

This invention relates to communication systems, including but not limited to transmission of messages in communication systems, including radio frequency (RF) communication systems.

BACKGROUND OF THE INVENTION

The basic operation and structure of a land mobile radio system is well known. Land mobile radio systems typically comprise one or more radio communication units (e.g., vehicle-mounted mobiles, portable radios, or dispatch consoles in a land mobile system and radio/telephones in a cellular system) and one or more repeaters that transceive information via RF communication resources. These communication resources, which may be used as voice and/or data resources, may be narrow band frequency modulated channels, time division multiplex slots, carrier frequencies, frequency pairs, spreading patterns, wireline telephone lines, and so forth. Land mobile radio, systems may be organized as trunked communication systems, where a plurality of communication resources is allocated amongst a group of users by assigning the repeaters on a communication-by-communication basis within an RF coverage area. Land mobile radio systems may be organized as conventional (or non-trunked) radio systems, where communication resources are dedicated to one or more groups of users.

Typically, a multiple-site trunked RF communication system includes communication units, communication sites, communication resources, and a communication resource allocator, also known as a central controller, site controller, or zone controller, which may reside within base stations or repeaters located at the communication sites. Each site has a substantially distinct coverage area and is geographically located within the system. A number of communication resources are assigned to each site, where at least one of the communication resources is used as a control channel, while the remaining communication resources are used as voice and/or data channels. The base stations or repeaters are used to generate the communication resources and are located at the site. Some communication systems are wide-area communication systems and comprise many communication sites, which may be grouped into communication zones to more effectively allocate the communication resources among the communication units.

The communication units, also called subscribers or subscriber units, are often arranged in talkgroups and may be located anywhere within the system (in the coverage area of any site) when communicating within the system. When a communication unit from a talkgroup requests a group call, the communication unit transmits, via the control channel of the site in which it is located, an inbound signalling word (ISW) to the central controller or other controlling entity. A group call allows all members of the same talkgroup that are located within the system to communicate with each other. The ISW generally comprises the requesting communication unit's individual identification number, the requesting communication unit's talkgroup, and a request for a group call. The ISW may contain more or less information, depending on the system.

Dispatch consoles may also be part of the system and are connected to the other fixed portions of the system (i.e., the infrastructure) via wire connections. Dispatch consoles may each control a multiplicity of communications resources or talkgroups and may communicate on these communications resources singly or simultaneously. In trunked systems, dispatch consoles request calls, similarly to the way communication units such as mobiles or portables issue ISWs, by making a PTT (Push-To-Talk) request and awaiting a PTT grant that gives the console permission to communicate and gives it an indication of which communication resource should be used for the communication. Similar to ISWs, the PTT request generally is comprised of the requesting console's individual identification number for a talkgroup, the desired talkgroup, and the request for a group call. The PTT request may also contain other information, depending upon the system type and the type of group call being requested.

Upon receiving the ISW, the central controller determines if there is an available communication resource to allocate for each site in which a member of the talkgroup presently is registered. If a communication resource is available in each of these sites, the central controller will place the group call and transmits an outbound signalling word (OSW) to the requesting communication unit and each member of the talkgroup. If a communication resource is not available in each of these sites, the central controller will not place the group call and instead transmits an outbound signalling word (OSW) to the requesting communication unit. The central controller may try to convert this request into an active call at a later time when resources are available. The central controller treats PTT requests similarly. If all of the necessary communication resources are available, the central controller issues a PTT grant. If a communication resource is not available at each of the required sites, the central controller issues a PTT busy to the dispatch console for the busy communication resource. Because dispatch consoles may transmit on multiple communication resources simultaneously, a console may receive PTT grants for some communication resources and PTT busies for other communication resources, even though the dispatcher desires the same audio message be sent on all communication resources. A busy may also result when a console attempts to use a resource already being used by another console. As a result, a portion (or all) of the call may be missed, the dispatcher may abort the call, or the dispatch may manually retransmit the message on the previously-busy communication resources.

When a mobile or portable communication unit is active in a group or individual call, and the communication unit travels out of the coverage area of its current site, the call needs to be handed off to another site for completion. A communication resource may not be available at the site, for example due to a high volume of calls, and a busy OSW may be issued to the subscriber unit. If a very high volume of calls is present at the time, the call may be completed before a new channel is assigned, hence the user will miss the completion of the call. In other situations, a call may be initiated, and a communication resource involved in the call may be removed from the call, for example, due to an emergency. Thus, any communication units engaged in the call on that communication resource will no longer be able to participate in the call while the resource is removed from the call. In addition, when a call requires a very large number of resources, it may be desirable to begin a communication with some communication resources, and add the additional communication resources as they become available, rather than waiting for resources for all of the subscriber units to participate in the call, so that communication throughput may be increased. Such a procedure, however, results in some users missing at least part of a call. For many users, such loss of communication is unacceptable.

Accordingly, there is a need for a method and apparatus that provides communication completion to all communication units, particularly for dispatch calls, even when busied or unavailable communication resources prevent such communication.

DESCRIPTION OF A PREFERRED EMBODIMENT

Figure 1:
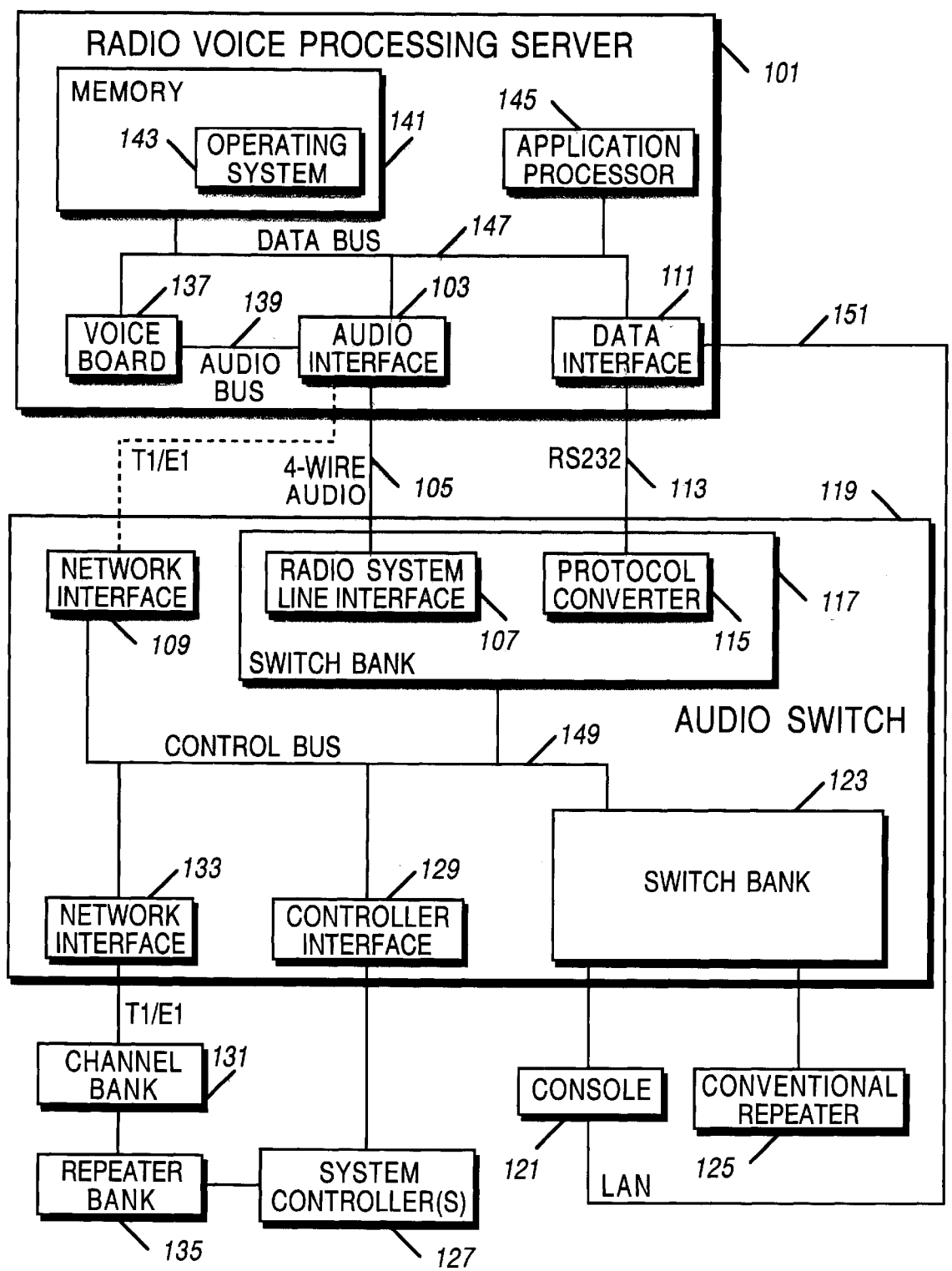
FIG. 1 is a block diagram of a communication system in accordance with the invention.

The following describes an apparatus for and method of providing delayed communications within an RF communication system. A radio voice processing server having an audio interface and a data interface provides delayed communications within a radio frequency communication system. The communications are recorded for later transmission when a resource becomes available or is no longer busy. Recordings may take place only at certain occurrences, or all the time. The present invention helps prevent users from missing communications because of busied or unavailable resources, especially when a call hand-off may have otherwise caused the user to miss the remainder of a communication. The present invention also alleviates the need for dispatchers to remember which resources were busy and then retransmit any multi-channel messages on the previously-busy resources.

A method of the present invention comprises the steps of detecting selection of simultaneous transmission of a message on at least one communication resource, recording at least a part of the message, yielding a recorded message, and when at least one of the at least one communication resource has a busied status, resulting in at least one busied resource, and subsequently when at least one of the at least one busied resource becomes free, transmitting at least a part of the recorded message on the at least one of the at least one busied resource that became free. The method may further comprise the step of monitoring the at least one busied resource for a free status. The transmitting step may begin before completion of the recording step, e.g., before the completion of the transmission on the first busied resource. Further, when at least two of the at least one communication resource are busied, resulting in a first busied resource and a second busied resource, the transmitting step may comprise the steps of transmitting at least a part of the recorded message on the first busied resource followed by transmitting at least a part of the recorded message on the second busied resource. The recorded message may be compressed before transmitting. The communication resources may be radio frequency communication resources.

Another method of the present invention comprises the steps of detecting selection of future transmission of a message on at least one communication resource, recording at least a part of the message, yielding a recorded message, and when a trigger event has occurred, transmitting at least a part of the recorded message on the at least one communication resource, wherein the step of transmitting begins before the recording step is completed. The trigger events may include one or more of the following: a time delay, an occurrence of an absolute time, a radio system event, a received message, and an alarm. The message may take the form of a talkgroup call transmitted on a single communication resource.

An apparatus of the present invention comprises a radio voice processing server having an audio interface and a data interface, arranged and constructed to provide delayed communications within a radio frequency communication system. The apparatus may further comprise a digital signal processor, a memory, an application processor, an operating system, and/or an audio bus. The audio interface may be a T1 interface.

The apparatus may further comprise a radio system line interface connected to the audio interface and a protocol converter connected to the data interface. In addition, the protocol converter may provide a gateway to provide access to radio system control information, and the gateway may be bi-directional. The protocol converter may be connected to the data interface via an RS232 link, and the protocol converter may reside in a computer interface-multiplex interface (CIMI) within a central electronics bank (CEB).

Alternatively, the apparatus may further comprise a radio system line interface connected to the audio interface and a console connected to the data interface via a local area network connection. The console may provide a proxy mechanism through which the voice processing server accesses at least one radio control service. The radio control services may include base station transmission, talkgroup transmission, and an indication of console transmissions, and/or an indication of base station availability may be provided.

The block diagram of a communication system is shown in FIG. 1. A radio voice processing server 101 comprises an audio interface 103 that provides an interface between the radio voice processing server 101 and the audio portions of the communication system, which is an RF communication system in the preferred embodiment. The audio interface 103 is operably connected to a radio system line interface 107 that provides an interface between the radio system's audio switch 119 and audio sources/sinks external to the switch. In the preferred embodiment, the radio system line interface 107 is provided by a 4-wire audio interface, such as a Base Interface Module (BIM) available from Motorola, Inc., that is modified to provide the functionality to operate under the control of a radio voice processing server 101. A 4-wire audio line 105 connects the audio interface 103 and the radio system line interface 107 in the preferred embodiment. Alternatively, a T1/E1 line may connect the audio interface 103 and the audio switch 119 via a network interface 109, which may be an Ambassador Electronics Board available from Motorola, Inc. In the preferred embodiment, the radio system line interface 107 resides within a switch bank 117, such as a Central Electronics Bank (CEB) available from Motorola Inc. The switch bank 117 or 123 generally contains interfaces for individual radio system audio sinks and sources such as dispatch console interfaces, conventional base station interfaces, dispatch telephone interfaces, and so forth. The switch bank 117 or 123 is part of the audio switch 119 in the preferred embodiment. The switch bank may also reside on its own in smaller systems, such as small conventional systems.

In the preferred embodiment, the radio system line interface 107 resides within an audio switch 119, such as an ambassador electronics bank available from Motorola, Inc., which audio switch 119 provides the general function of providing switching capability between radio system base stations or repeaters 125 (in conventional systems), dispatch consoles 121, encryption resources (not shown), dispatch center telephone resources (not shown), and/or digital encoding/decoding resources (not shown).

The radio voice processing server 101 also comprises a data interface 111 that provides an interface between the radio voice processing server 101 and the radio system's call processing commands and messages. The data interface 111 is operably coupled to a protocol converter 115 that provides translation and reformatting capabilities so that the communication system call processing commands and messages can be moved between a control data bus 149, which operably connects all the devices with the audio switch 119, and an interface to a device outside the audio switch 119. The protocol converter provides a gateway to provide access to radio system control information. The data interface 111 and protocol converter 115 are connected by an RS232 cable 113 in the preferred embodiment. The protocol converter 115 resides in a computer interface-multiplex interface (CIMI) that is part of a CEB in the preferred embodiment.

The CIMI module is designed to translate between the control bus 149 and computing devices external to the audio switch 119, for example to provide an interface for computer-aided dispatch computers in radio communications systems, and is modified to provide support for the radio voice processing server 101, such as resource transmission, resource status information, and so forth.

In an alternative embodiment, a console 121, which provides dispatch operation for the communication system (e.g., a dispatch console), may be connected to the data interface 101 via a local area network (LAN) 151. The console 121 is also connected to a switch bank 123 in the preferred embodiment. The console 121 also includes an applications program interface (API) that supports dispatch console functionality, such as resource transmission, resource status information, and so forth. The console 121 may provide a proxy mechanism through which the voice processing server 101 accesses one or more radio control services supported by the API and accessed via the LAN. In this instance, the voice processing server 101 provides the source for audio for a transmission. The console 121 provides the mechanism through which the voice processing server 101 detects transmissions, busied/freed resources, and trigger events, as well as a mechanism through which transmissions take place, in the steps of the flowcharts of FIG. 2 and FIG. 3. The radio control services include base station transmission, talkgroup transmission, providing an indication of console transmissions, and providing an indication of base station availability.

When the present invention resides within a trunked communication system, one or more system controllers 127, a controller interface 129, one or more channel banks 131, one or more network interfaces 133, and one or more repeater banks 135 are likely to be present. In the preferred embodiment, the system controllers 127, such as site controllers and/or zone controllers, are connected to the controller interface 129, which resides within the audio switch 119 in the preferred embodiment, and the repeater bank 135. Channel banks 131, which are multiplexers that place multiple individual conversations onto one high-speed link, such as a T1/E1 link, are connected to both a network interface 133, which resides within the audio switch 119 in the preferred embodiment, and the repeater bank 135. In the preferred embodiment, the radio voice processing server comprises a voice board 137, also known as a voice card or a speech card in the art, which voice board contains DSP (digital signal processing) resources that allow the captured voice messages to be processed and saved to memory 141 and later retrieved from memory 141 and played through the audio interface 103. The voice board 137 and the audio interface 103 are connected by an audio bus 139, such as an MVIP (Multi-Vendor Interface Protocol), H.100 protocol, or SCSA (Signal Computing System Architecture) bus, that allows audio to pass between them 103 and 137. In addition, the radio voice processing server may comprise an operating system 143, within memory 141, and an application processor 145 that provide a computing environment for the radio voice processing server 101 software and a mechanism for controlling the audio and data interfaces and the voice card. In the preferred embodiment, the radio voice processing server 101 is a computer, such as an IBM personal computer.

The protocol converter 115 provides a means of translating between control bus 149 messages and external (to the audio switch 119) data link messages. The protocol converter 115 reformats messages received via the control bus 149 into the format of the external link 113 and sends those messages on the external link 113. The protocol converter 115 also reformats messages received via the external link 113 into a format suitable for the internal bus data bus and sends those messages on the internal data bus. In the preferred embodiment, to provide the radio voice processing server 101 with the ability to receive messages that indicate transmission attempts, transmission grants, transmission endings, and busy conditions, and to allow the radio voice processing server 101 to send messages that cause base stations/repeaters to transmit and end transmission, the gateway provided by the protocol converter 115 is bi-directional.

Figure 2:
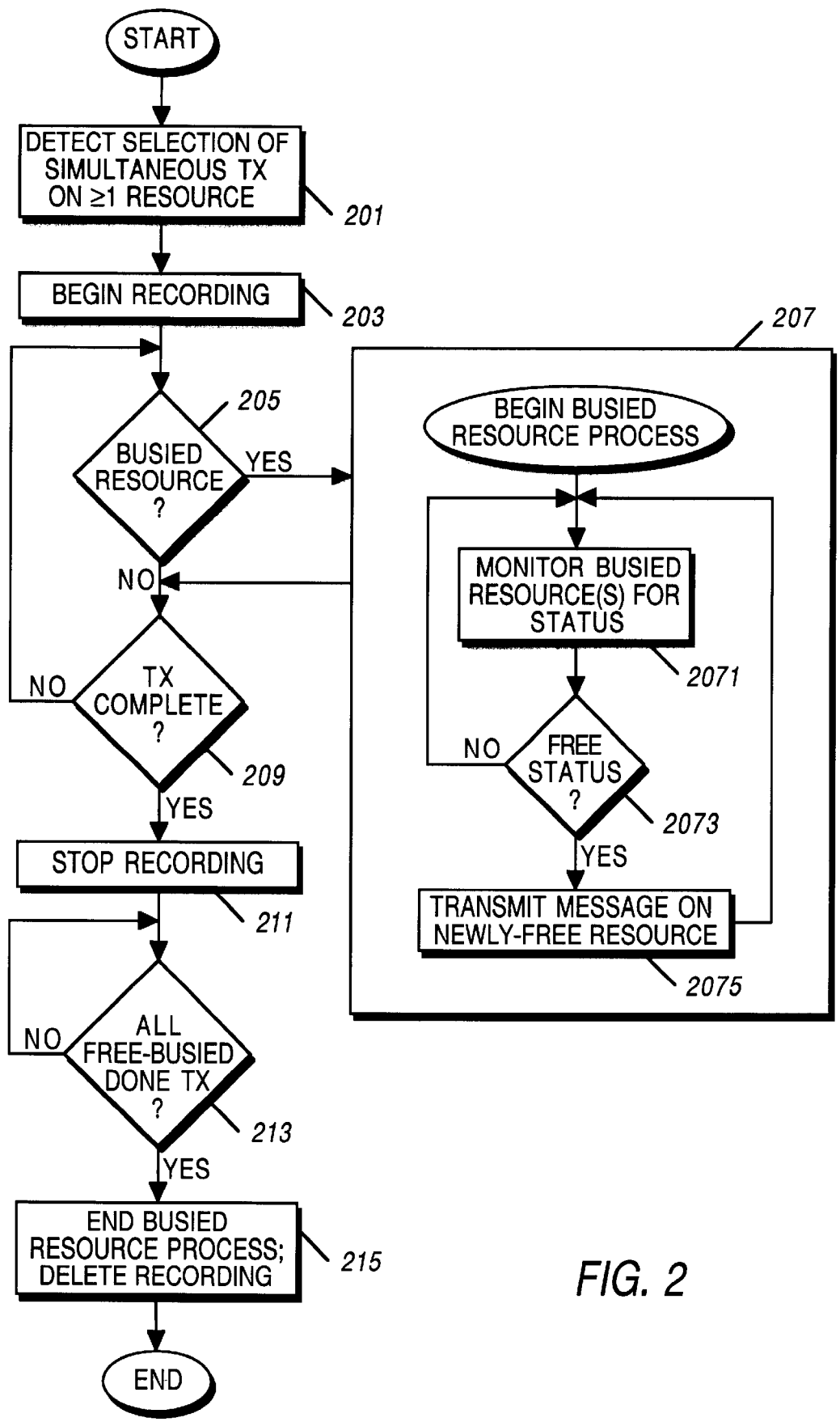
FIG. 2 is a flowchart showing a method of message transmission in accordance with the invention.

A method of message transmission is shown in the flowchart of FIG. 2. At step 201, selection of simultaneous transmission on two or more resources, or alone on one resource, is detected. At step 203, a recording begins for the transmission. The recording may include voice and/or data from a transmission. In the preferred embodiment, the recording device is in the radio voice processing server 101, where recording is performed by converting the audio to digital data with the DSP resources 145 in the radio voice processing server 101 and saving that data to the hard drive memory 139. Other locations and methods for recording will be successful as well.

At step 205, it is determined if one of the resources for which the transmission is intended is a busied resource. The resource may be a busied resource from the beginning of transmission, may turn into a busied resource during the transmission, or may simply be an unavailable resource, e.g., due to maintenance or failure, and so forth. If there is a busied resource at step 205, the process continues with step 207, where a busied resource process is activated. Once begun, the busied resource process (steps 2071, 2073, and 2075) runs simultaneously with steps 205, 209, 211 and 213 until the busied resource process is ended at step 215. After the busied resource process is activated at step 207, the rest of the process continues, beginning with step 209.

The busied resource process is as follows. At step 2071, any busied resources are monitored for their status. If at step 2073, a free status on one of the busied resources is reached or obtained, i.e., the resource becomes free, the process continues with step 2075, where the recorded message is transmitted on the newly freed resource, and the process continues with step 2071. If at step 2073 a free status has not yet been obtained on one of the busied resources, the process continues with step 2071.

If there is no busied resource at step 205, the process continues with step 209, where it is determined if the transmission begun at step 201 is complete. If the transmission is not complete, the process continues with step 205, otherwise the process continues with step 211. At step 211, when the transmission is complete, the recording is stopped. At step 213, it is determined if all the formerly busied and now free resources are done being transmitted upon, in other words, it is determined if all the transmissions begun at step 2075 are complete. If the transmissions are not complete, the process continues with step 213 until they are all completed. When the transmissions are completed, the recording is deleted at step 217, and the process ends.

The method of FIG. 2 may be applied to unavailable resources, instead of busied resources. The steps of FIG. 2 would apply to unavailable resources instead of busied resources and available status instead of free status. In this application, the method may comprise, for example, the steps of detecting selection of transmission of a message on one or more communication resources, recording at least a part of the message, yielding a recorded message, and when at least one of the one or more communication resources is unavailable, resulting in one or more unavailable resources, and subsequently when at least one of the one or more unavailable resources becomes available, transmitting at least a part of the recorded message on the at least one of the one or more unavailable resources that became available. The transmitting step may begin before completion of the recording step. In addition, a user of a communication unit in the communication system of FIG. 1 may request that all or any part of a message be retransmitted to the user, for example, when a resource is busied during a call or the communication unit loses power temporarily. As an option, only the portion of the call not previously received would be retransmitted.

Figure 3:
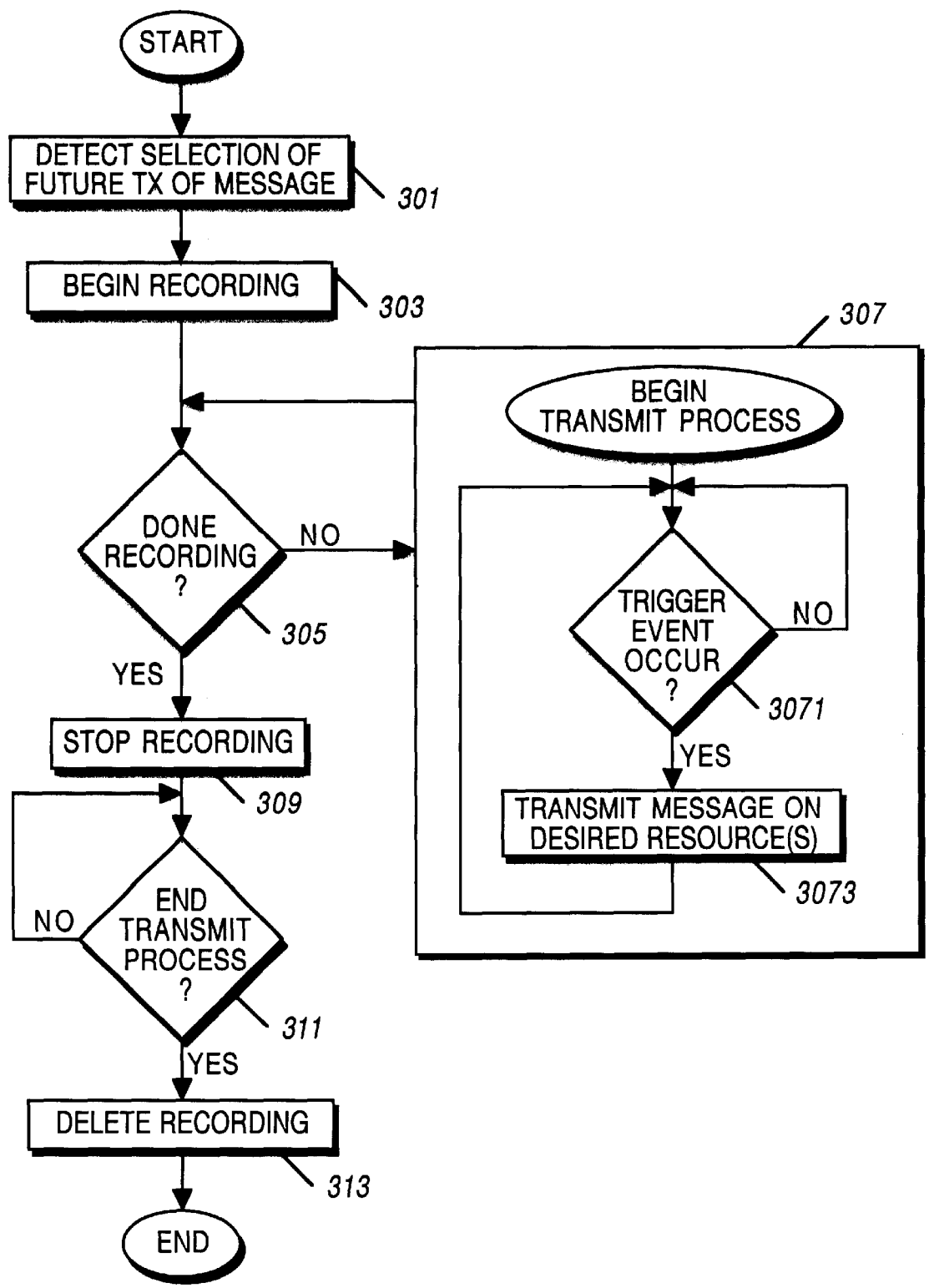
FIG. 3 is a flowchart showing a method of delayed message transmission in accordance with the invention.

A method of delayed message transmission is shown in the flowchart of FIG. 3. At step 301, selection of a future transmission of a message is detected. At step 303, a recording begins of the message to be transmitted. At step 305, it is determined if the recording is completed. If the recording is not yet completed at step 305, the process continues with step 307, where a transmit process is activated. Once begun, the transmit process (steps 3071, and 3073) runs simultaneously with steps 305, 309, and 311 until the transmit process is ended at step 311. After the transmit process is activated, the rest of the process continues, beginning with step 305.

The transmit process is as follows. At step 3071, it is determined if a trigger event has occurred. A trigger event may be a time delay, an absolute time, a radio system event (such as a an emergency call from a particular user, a radio status of a certain value, a request by a user to receive a message), a received message, or an alarm. For example, a user of a communication unit in the communication system of FIG. 1 may request that all or any part of a message be retransmitted to the user, such as when a resource is busied during a call, and such a request would be a trigger event. If the trigger event has not yet occurred at step 3071, the process continues with step 3071 until a trigger event occurs or the process is stopped at step 311. If the trigger event has occurred at step 3071, the process continues with step 3073, where the message is transmitted on the desired resource(s). This message may be a group message that is transmitted on a single communication resource, such as a radio frequency communication resource, or an individual or private message, such as one directed to a particular person.

If the recording is completed at step 305, the process continues with step 309, where the recording is stopped. At step 311, it is determined at the transmit process should end. The transmit process may end, for example, when all requests to transmit the message have taken place, after a time-out period, allowing for late requests for additional transmissions, and so forth. If it is determined not to end the transmit process at step 311, the process continues with step 311, until it is determined to end the transmit process. When it is determined to end the transmit process at step 311, the process continues with step 313, where the recording is deleted, and the process ends. An advantage of this method of the present invention is that at least a part of the recorded message can be transmitted on a communication resource before the recording is completed.

The recorded message may be compressed before transmitting at step 211 or at step 311. For example, time compression, including removing pauses and blanks, may be applied to the recorded message. Data compression to reduce the recorded message to fit within the required bandwidth, for example in a digital system, may also be applied. In any event, compression may not exceed into the negative time realm, as is known in the art.

The present invention has many advantages, such as initiating a call when all resources are required to convert the call are unavailable, such as when at least some of the resources are busy. Thus, calls may commence earlier, although others may receive delayed versions of the message, higher throughput may be possible in the long run on the communication system, thereby allowing more users on the system or providing greater throughput and hence fewer busy conditions in the long run. The present invention provides for a user to request retransmission of a part of a message that the user missed. The present invention may be applied to trunked and conventional communication systems, including RF and wireline systems. Users that cannot achieve a handoff, for example due to busied resources at the cell, are able to receive the part of the message they may have missed. In addition, the present invention provides for transmission of a single audio source and use it to provide audio to multiple, disparate transmitters, such as conventional, trunked, regrouped trunked, and/or telephone lines. Other advantages of the present invention include: delaying the transmission of a message some specific amount of time, scheduling in advance the transmission of a message for a particular time without requiring further dispatcher involvement, sending a message automatically and without further dispatcher involvement in response to some particular system event, removing the need for dispatchers to track resource busies when initiating multiple-resource radio transmissions (all points bulletins, multi-select calls) and to manually follow up with repeated messages when those resources become free, automatically allowing resources that become busy because of higher-priority calls to receive the messages that they had earlier missed.

What is claimed is:

1. In a communication system including a radio voice processing server having access to radio system control information, a method comprising the radio voice processing server performing the steps of:

detecting an attempt, by a communication device, of simultaneous transmission of a message on a plurality of communication resources;

in response to detecting the attempt, and until detecting an end of transmission of the message, recording the message, yielding a recorded message;

monitoring the communication resources for busy conditions; and if a communication resource of the plurality of communication resources is not busied, defining a free resource, allowing unimpeded transmission of the message, from the communication device, on the free resource unless and until such time as the free resource becomes a busied resource; otherwise if a communication resource of the plurality of communication resources is busied, and subsequently becomes freed, transmitting at least a part of the recorded message, from the radio voice processing server, on the freed resource.

2. The method of claim 1, wherein the transmitting step is begun before completion of the recording step.

3. The method of claim 1, wherein at least two of the plurality of communication resources are busied resources, resulting in a first busied resource, and a second busied resource, and wherein the first busied resource and the second busied resource subsequently become freed, defining first and second freed resources, the transmitting step comprising the steps of transmitting at least a part of the recorded message on the first freed resource followed by transmitting at least a part of the recorded message on the second freed resource.

4. The method of claim 1, further comprising the step of compressing the recorded message before transmitting.

5. The method of claim 1, wherein the plurality of communication resources comprise radio frequency communication resources.

6. The method of claim 1 wherein a communication resource is busied at a beginning of the transmission and subsequently becomes freed, the step of transmitting at least a part of the recorded message comprising transmitting the entire recorded message on said communication resource.

7. The method of claim 1 wherein a communication resource is not busied at a beginning of the transmission, becomes busied during the transmission and subsequently becomes freed, the step of transmitting at least a part of the recorded message comprising transmitting a part of the recorded message occurring after said resource became busied, on said communication resource.

8. The method of claim 7 wherein said communication resource is not busied at a beginning of the transmission and becomes busied during the transmission because the message transmitted on said communication resource is preempted by a higher priority message.

9. The method of claim 1 wherein the radio voice processing server obtains access to radio system control information via a protocol converter defining a gateway to the radio system control information.

10. In a communication system including a radio voice processing server having access to radio system control information, a method comprising the radio voice processing server performing the steps of:

detecting an attempt, by a communication device, of simultaneous transmission of a message on a plurality of communication resources;

in response to detecting the attempt, and until detecting an end of transmission of the message, recording the message, yielding a recorded message;

monitoring the communication resources for availability conditions; and if a communication resource of the plurality of communication resources is available, allowing unimpeded transmission of the message, from the communication device, on the available resource unless and until such time as the available resource becomes an unavailable resource; otherwise if a communication resource of the plurality of communication resources is unavailable, and subsequently becomes available, transmitting at least a part of the recorded message, from the radio voice processing server, on the resource the became available.

11. The method of claim 10, wherein the step of transmitting begins before the recording step is completed.

* * * * *

UNITED STATES PATENT AND TRADEMARK OFFICE
CERTIFICATE OF CORRECTION

PATENT NO.   : 6,259,672 B1
DATED        : July 10, 2001
INVENTOR(S)  : Jeffrey Lohrbach It is certified that error appears in the above-identified patent and that said Letters Patent is hereby corrected as shown below:

<u>Column 10,</u>
Line 34, "voice processing server, on the resource the" should be -- voice processing server, on the resource that --

Signed and Sealed this

Twenty-eighth Day of May, 2002

*Attest:*

*Attesting Officer*

JAMES E. ROGAN
*Director of the United States Patent and Trademark Office*